June 9, 1964 M. J. DE GOOD ETAL 3,136,406
ACCUMULATIVE-TYPE CONVEYOR
Filed June 20, 1962 6 Sheets-Sheet 1

INVENTORS
MAYNARD J. DE GOOD
CARMELO A. DI MAGGIO
WILLIAM P. HIDDEN
BY DONALD A. SCHNEIDER

ATTORNEYS

INVENTORS
MAYNARD J. DE GOOD
CARMELO A. DI MAGGIO
BY WILLIAM P. HIDDEN
DONALD A. SCHNEIDER

*Price & Heneveld*

ATTORNEYS

United States Patent Office 3,136,406
Patented June 9, 1964

3,136,406
ACCUMULATIVE-TYPE CONVEYOR
Maynard J. De Good, Grand Rapids, Mich., Carmelo A. Di Maggio, Waltham, and William P. Hidden, Wenham, Mass., and Donald A. Schneider, Ada Township, Kent County, Mich., assignors, by direct and mesne assignments, to The Rapids-Standard Company, Inc., Grand Rapids, Mich., a corporation of Michigan
Filed June 20, 1962, Ser. No. 203,860
20 Claims. (Cl. 198—160)

This invention relates to conveyors, and more particularly to a means by which the power available in a continuously moving endless propelling member may be tapped to provide the power necessary to operate auxiliary equipment utilized with the conveyor. In the particular environment herein made illustrative of this invention, it is used as the energy source for shifting the propelling member position control devices of an accumulator type conveyor.

It has long been recognized in the conveyor industry that powered conveyors, particularly those having an endless chain or belt, have adequate reserve power in the propelling member for operating various types of auxiliary equipment which must be utilized along the conveyors. However, the problem has always been how to obtain this power and at the same time accurately control its utilization. Normally, the power is needed only intermittently whereas the propelling member supplies it continuously.

Various devices have been proposed to accomplish the purpose of this invention. However, these devices have not been satisfactory for several reasons. These reasons include, excessive wear on the propelling member, excessive bulk and complexity of the power take-off equipment, limitations on the amount of power and the manner in which it was made available imposed by the construction of the power take-off equipment itself. These devices, as a whole, have been costly and limited in application.

This invention overcomes these problems. It provides a compact, simple, and inexpensive means of tapping the power of the propelling member. It makes the power available in a manner and in amounts which are suitable for the operation of a wide variety of auxiliary equipment. At the same time, this invention, for the first time, provides such a means which may be accurately controlled. The control mechanism may be of a wide variety of types and requires a minimal of force to effect its operation. Further, the invention is such that the lapse between actuation of a control and actual change in power utilization from the power source is so short that timing of the operation of the auxiliary equipment can be made extremely accurate. With these characteristics, this invention provides a power take-off for auxiliary equipment which is versatile in its application to many different and widely variant types of uses. This is true whether the auxiliary equipment requires a minimum or a substantial amount of power for its operation.

In the particular environment in which this invention is illustrated and described, it is utilized to solve a problem which has been encountered in accumulator type conveyors. In this type of conveyor, the propelling member is supported in such a manner that it is movable toward and away from the articles to control the application of propelling force to the articles. Means are provided to sense the presence of an article and in response to this the propelling member is shifted to either stop or initiate movement of articles on the conveyor. The sensing of the articles may be done by mechanical means which is physically moved by the articles or by other means which generates a signal, such for example as interruption of a light beam or the tripping of an electrical switch. In the former situation, the weight of the article is normally utilized as the energy source for effecting the physical movement of the propelling member. In the latter case, an auxiliary power source such as a motor, air cylinder or solenoid has been provided to effect movement of the propelling member. These auxiliary power sources are expensive units and also require an available energy source such as an electrical conductor or a compressed air line.

In those applications utilizing the weight of the article as the energy source, there is a conflict of purpose between the sensors and the actuation propelling member supporting units. If the articles are of reasonably uniform size and weight, the problem does not occur. Where, however, articles of widely varying size and weight are conveyed, the force required to support the propelling member in article propelling position must be such as to assure movement of the heavier and more bulky articles. Since the sensing units must mechanically shift the propelling member from this position, this force must be supplied entirely by the weight of the article actuating the sensing unit. In the case of the small or lightweight articles, it has been found that this force may be more than that which the article can supply with the result that the lighter articles become hung-up on the sensing units. In some cases where only very lightweight articles are involved, the articles are incapable of shifting even the weight of the propelling member itself.

This invention overcomes these problems by providing a means by which the power of the propelling member itself is utilized to effect the shifting of the propelling member between propelling and non-propelling positions. The sensing units are freed of the necessity of providing this force and can be designed to operate with very light pressures. Thus, they are sensitive and can be made to operate with small and light articles.

This invention provides a means of utilizing the available power in the propelling member eliminating the necessity of providing auxiliary power sources. This reduces bulk and weight. It also reduces the initial cost and ultimate maintenance of the equipment. All of these are important advantages stemming from this invention.

These and other objects and advantages of this invention will be readily understood by those acquainted with the design and construction of conveyor equipment upon reading the following specification and the accompanying drawings.

In executing the objects and purposes of this invention, there has been provided in a conveyor a wheel or pulley which engages the return run of an endless propelling member such as a belt. This wheel through a clutch is connected to auxiliary equipment which utilizes the power derived from the propelling member. The operation of the auxiliary eqipument is governed by the clutch which controls the transmission of power.

In the particular embodiment of this invention illustrated in FIGS. 1–12 the clutch is connected to a motion translating device which translates the rotary motion of the wheel to linear motion which will pivot or otherwise raise and lower the supports controlling the vertical position of the upper or forward run of the propelling member. The clutch has means to control its engagement and disengagement. This means is connected to sensors which detect the presence of an article and in response to the article actuate the clutch to connect the wheel to the motion-translating device for shifting the position of the connected propelling member supporting devices. In this device, the propelling member and the wheel are in constant operation but the motion-translating device operates intermittently in response to regulation by the clutch. In this embodiment the movable propelling member supports constitute the auxiliary equipment which, while controlling the movement of the articles, do not themselves actually propel them.

Figure 1:
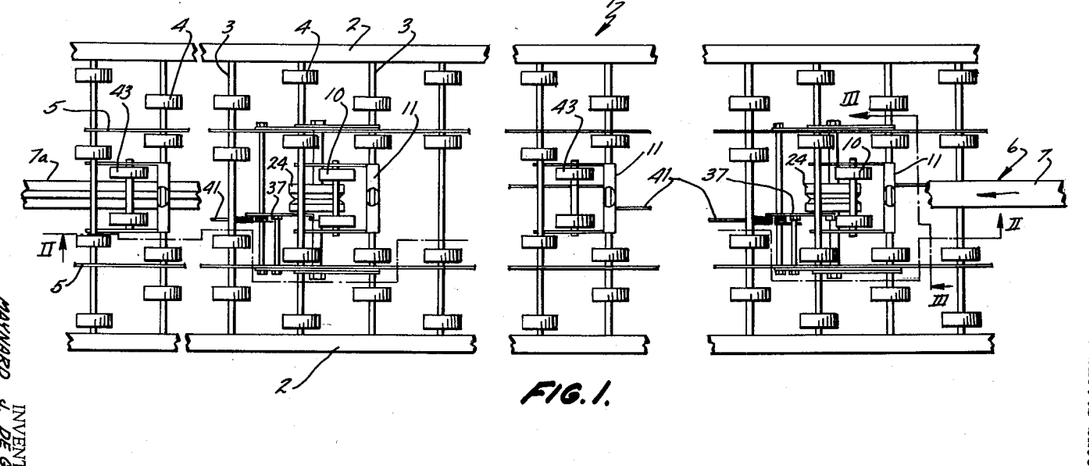
FIG. 1 is a fragmentary plan view of a conveyor equipped with this invention.
Figure 2:
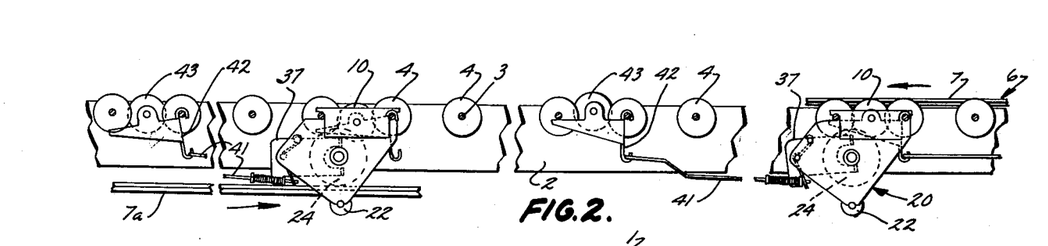
FIG. 2 is a fragmentary sectional elevation view taken along the plane II—II of FIG. 1.
Figure 3:
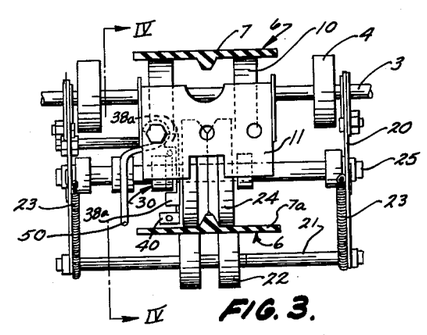
FIG. 3 is a sectional elevation view taken along plane III—III of FIG. 1.

Referring to the drawings and particularly to FIGS. 1 and 2, there is illustrated a conveyor 1 of conventional construction having side rails or frame members 2 connected by axles 3. Rotatably mounted on the axles at suitable spacings are article supporting wheels 4. The wheels 4 form an article supporting and conveying surface.

Paralleling the frame members 2 and spaced inwardly of them are a pair of parallel reinforcing straps 5. Mounted at the center of the conveyor is a powered propelling member or belt 6. A fragmentary portion of the forward or upper run 7 of this propelling member is shown on the right-hand side of FIG. 1 and a fragmentary portion of the lower or return run 7a of this propelling member is shown on the left-hand side of FIG. 2. It will be recognized that the propelling member passes over terminal pulleys at each end of its run and has some type of conventional power equipment to drive it. These are not illustrated, inasmuch as they are conventional and many types of equipment are available for this purpose.

Figure 4:
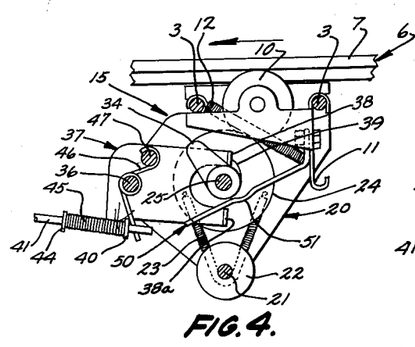
FIG. 4 is a fragmentary sectional elevation view taken along the plane IV—IV of FIG. 3.

At spaced intervals along the conveyor, the upper run 7 of the propelling member is supported by wheels 10. The wheels 10 are mounted on hangers 11 which in turn are pivotally mounted on the axles 3 (FIGS. 1, 2, 4 and 5). These hangers are urged into raised position by a spring 12. The upward movement of the hangers under the bias of the spring 12 is limited by contact between the end of the hanger and an adjacent axle 3 (FIG. 4). The hangers 11 may be operatively independent or connected together for simultaneous operation by suitable mechanical linkages.

Depending from the axles 3 at periodic intervals along the conveyor are power take-off units 15 each having a frame assembly 20. The lower end of each frame assembly mounts a shaft 21 which rotatably supports a wheel 22. While the shafts 21 may be rigidly mounted to the frame, in the particular embodiment shown, the frame is vertically slotted so that the shaft 21 may shift vertically. The shaft 21 is biased into upward position by a spring 23 at each end. The wheels 22 are beneath and support the return run 7a of the propelling member. They hold the return run of the propelling member up against the power take-off wheel 24 which in turn is rotatably mounted on the shaft 25. The shaft 25 is rotatably journalled in the frame assembly 20. In the particular construction illustrated, the propelling member has a central rib which rides in a central, circumferential channel 24a of the wheel 24.

Figure 6:
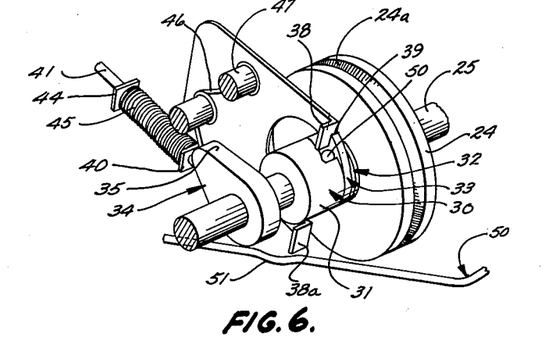
FIG. 6 is a fragmentary perspective view of the drive and clutch mechanism of the units illustrated in FIGS. 4 and 5.

As is more clearly shown in FIG. 6, adjacent the wheel is a power interruption means or clutch unit 30 having a driven member 31 secured to the shaft 25 whereby, when rotated, it will cause rotation of the shaft. Secured to the wheel is a driving member 32. Between the driving member 32 and the driven member 31 is a control element 33 which, as will be brought out more fully hereinafter, governs or regulates the engagement and disengagement of the clutch unit 30. Also mounted to the shaft is a cam member 34 having a radially projecting arm or finger 35. The cam unit 34 rotates with the shaft 25 when the shaft is rotated by the clutch. The cam unit serves as a motion translating device.

Also secured to the frame assembly 20 is a rod 36. The rod 36 pivotally mounts the stop element or regulator 37. One end of the regulator 37 is bifurcated and has a pair of ears 38 and 38a. The ears 38 and 38a are vertically aligned and are positioned to engage the radially projecting stop finger 39 on the clutch control element 33. The regulator 37, being pivotally or rockably mounted on the rod 36 may shift vertically the ears 38 and 38a. The ears 38 and 38a are so spaced that when one of them is moved into position to engage the stop finger 39, the other will be spaced sufficiently from the control element 33 that the stop finger 39 will pass the other of the ears. Thus, as the regulator plate 37 is rocked vertically, alternate ones of the ears 38 and 38a will move into position to engage the stop finger 39.

Below the rod 36, the regulator 37 has a laterally extending flange 40. A connecting rod 41 passes through the flange 40 and extends downstream of the conveyor to a hanger 42 which supports sensing wheels 43. Downstream of the flange 40 to a stop 44 is mounted about the connecting rod 41 and between it and the flange 40 the rod is surrounded by a spring 45. Bearing against the upstream side of the flange 40 is a wrap spring 46 which, intermediate its ends, is wrapped about the rod 36. The other end of the wrap spring 46 is secured to pin 47 fixed to the frame assembly 20.

Figure 5:
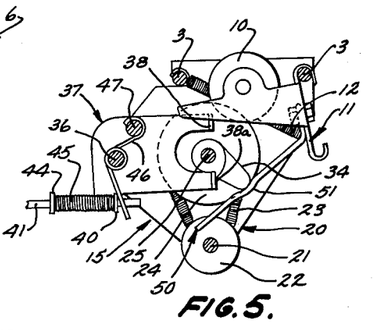
FIG. 5 is a view identical to FIG. 4 with the exception that the propelling member supporting unit is shown in retracted or lowered position.

The sensing wheels 43 are spaced laterally outwardly of the propelling member 6 and are held in a raised position such that their upper surfaces are above the conveying surface defined by the tops of the wheels 4 and the top surface of the forward run 7 of the propelling member 6. The hanger 42 supporting the sensing wheels is pivotally mounted on one of the axles 3. When an article passes over the sensing wheels, it depresses them to the level of the conveying surface. This motion pivots the hanger 42, shifting the connecting rod 41 to the right as it is illustrated in FIGS. 4 and 5. This in turn shifts the regular plate 37 from the position illustrated in FIG. 4 to the position illustrated in FIG. 5.

The spring 45 is weaker than the wrap spring 46. When the connecting rod 41 is shifted to the right, the spring 45 is first partially compressed and then the wrap spring 46 is overcome, permitting the movement of the connecting rod 41 to pivot the regulator plate 37 upwardly to the position shown in FIG. 5. This arrangement is possible because the total movement of the regulator plate 37 is quite small. Should the connecting rod 41 be shifted further to the right after the regulator 37 has completed its travel the spring 45 acts as an override device permitting this to occur without damage to the mechanism.

The wrap spring 46 automatically returns the regulator 37, connecting rod 41 and hanger 42 to their original position upon release of the sensing wheels 43. Since this mechanism is relatively light, the wrap spring 46 can be comparatively weak, permitting the sensing wheels 43 to be depressed by the application of very light loads. Also, since very little energy is required to shift the regulator 37, the sensing system can be balanced for a high degree of sensitivity.

The regulator plate 37, together with the associated equipment which effect the shifts in the regulator plate's position, constitute a control means for the control member or element of the clutch.

The hanger 11 has a depending lever 50. The lever 50 has a notched portion 51 designed to cooperate with the cam finger 35. As is shown in FIG. 4, when the cam finger 35 is positioned away from the lever 50, the spring 12 swings the hanger 11 into its raised position. This moves the lever 50 up to or almost into contact with the back or small side of the cam 34. However, when the cam finger 35 is rotated to a position where it extends toward the lever, it forces the lever outwardly until the cam finger seats in the notch 51 (FIG. 5). The outward swinging or oscillation of the lever 50 swings the hanger 11 to the right as illustrated in FIG. 5, lowering the propelling member to drop to a position where it does not contact the articles. In this position, no propelling force is transmitted to the articles resting on the wheels 4. At the same time, additional hangers and their associated propelling member supporting wheels may be simultaneously lowered by connecting the hanger 11 to these hangers by suitable linkages.

Figure 7:
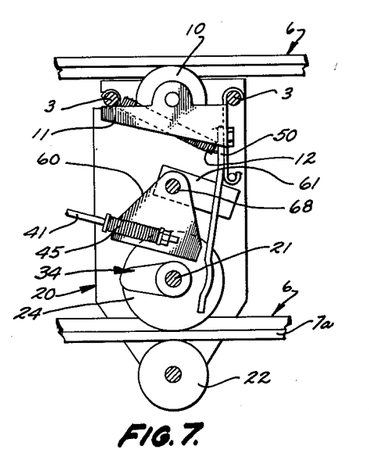
FIG. 7 is a fragmentary sectional elevation view similar to FIG. 4 but showing a modified form of the invention.
Figure 8:
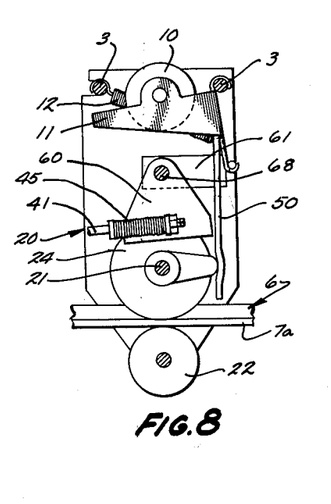
FIG. 8 is a fragmentary sectional elevation view identical to FIG. 7 with the exception that the unit is shown in a different operating position.

FIGS. 7 and 8 illustrate a modified form of this invention. In this particular form, the same basic frame members 20 are utilized along with the shaft 21 including the wheel 24, belt supporting wheels 22 and cam member 34. However, in this case, both the wheel 24 and the cam member 34 are secured to the shaft 21. There is no clutch in this structure. Thus, rotation of the wheel 24 continuously rotates the cam member 34. The same hanger arrangement 11 is utilized and it also has a lever 50 which depends to make contact with the cam member 34. On each rotation of the cam member 34 the lever 50 is oscillated outwardly by the cam member, swinging the hanger 11 to its retracted or lowered position.

The assembly includes the plate 60 and a stop arm 61 which are connected together for simultaneous movement. They are supported for pivotal movement by the rod 68. When the rod 41 is shifted to the left as illustrated in FIG. 7, the plate 60 and the stop arm 61 are lowered to permit the lower end of the hanger to swing above it without interference. Thus, the hanger is free to pivot through its full oscillating cycle each time the lever 50 is contacted by the cam member 34. As in the case of the construction illustrated in FIGS. 3–5, the rod 41 is connected to a normally raised sensing unit. This holds it to the left as illustrated in FIG. 7. When the sensing unit is depressed, the arm is shifted to the right as illustrated in FIG. 8. This shifts the stop arm 61 upwardly bringing the end of the stop arm into the path of movement of the lower end of the hanger 11.

The hanger 11 once caught behind the end of the raised stop arm 61 will be prevented from returning to its normal position until the stop arm is once again lowered. When the hanger 11 is engaged by the stop arm 61, the wheel 10 is held in lowered position disengaging the propelling member 6 from the articles.

The spring 45 by which the end of the connecting rod 41 is secured to the plate 60 provides an override connection. Should the sensing unit be lowered, shifting the connecting rod 41 to the right while the hanger 11 is raised the hanger 11 will prevent the stop arm 61 from swinging upwardly. Under these circumstances, the spring 41 will compress permitting the rod to shift without damage to the mechanism and without significantly increasing the pressure necessary to depress the sensing unit. The stop arm 61 will be released to rise upon the next rotation of the cam member 34 when it shifts the lever 50 to the right. Once the stop arm 61 is free to rise the spring 45 will automatically move it. The raised stop arm 61 holds the hanger 11 and the lever 50 in a position which is just short of the extreme position to which the lever is shifted by the cam member 34. Thus, on each rotation of the cam, the hanger 11 shifts away slightly from the end of the stop arm 61. So long as the sensing unit is depressed the stop arm will remain up, but as soon as the sensing unit is released and returns to its original position, the stop arm will be free to drop into its lowered position the next time the cam passes the lever 50 and releases the bind between the hanger and the end of the stop arm 61.

In this arrangement, the bias for the sensing unit, the connecting rod 41 and the plate-stop arm assembly is provided by a spring secured to the hanger of the sensing unit While this spring is not illustrated, it is similar to spring 12 and functions in the same manner.

Figure 9:
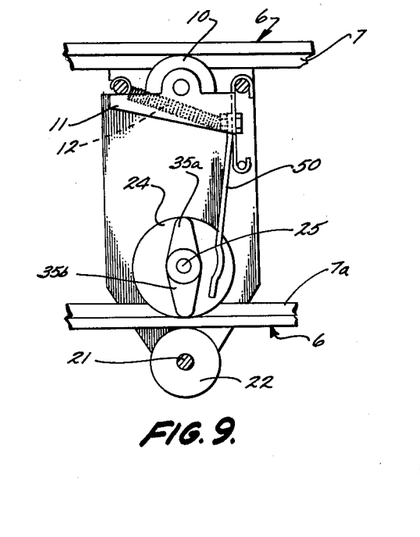
FIG. 9 is a sectional elevation view along the same plane as FIG. 7 but showing a further modified construction.

It will be recognized that by omission of the stop arm 61 and its related structure, the construction illustrated in FIGS. 7 and 8 will produce an intermittent or pulsing conveyor. Such an arrangement is illustrated in FIG. 9. This figure also illustrates the fact that the number of pulses delivered to the hanger 11 on each rotation of the cam can be increased if desired. By changing the cam 34a to have two opposed arms 35a and 35b two pulses will be generated on each rotation. More arms can be added to further increase this effect. With a single finger each rotation of the cam will produce a long propelling pulse and a short non-propelling interval. If the double arm is used on the cam the number of non-propelling intervals will be doubled.

Figure 10:
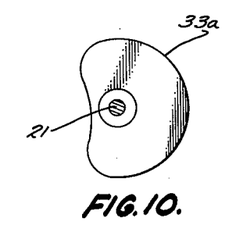
FIG. 10 is a view of a modified cam for the invention.

The cam can be reshaped as suggested in FIG. 10. In this case, the cam 33a is so shaped that the interval during which the hanger 11 is held in retracted or depressed position, is a substantial portion of the total period of rotation of the cam. Thus, the propelling pulse will be relatively short and the dwell period will be relatively long.

Figure 11:
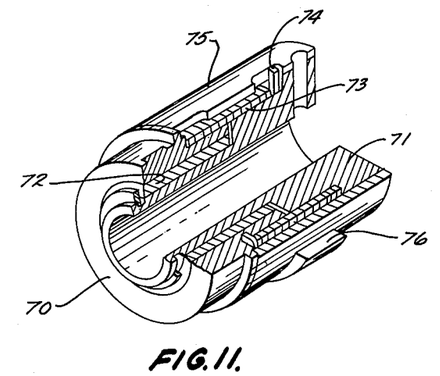
FIG. 11 is a perspective sectional view of a spring clutch applicable to this invention.

FIG. 11 illustrates a substitution for the specific clutch construction described in connection with FIGS. 4, 5, 6 and to be described in connection with FIGS. 13 through 16. In this case a spring clutch is utilized. The spring clutch has a driven hub 70 and a driving hub 71. The hubs are partially telescoped and where the driven hub 70 seats over the driving 71 the two are separated by a suitable bearing element 72. A wrap spring 73 seats over a portion of the driven hub 70 and a portion of the driving hub 71, and has an end 74 projecting into a suitable aperture in the control ring 75. The control ring has a stop 76. When the stop 76 is engaged, holding the control ring 75 stationary, the spring 74 is caused to slightly uncoil releasing its grip on the hubs. However, as soon as the stop 76 is released, the spring will tighten down about the hubs 70 and 71 transmitting motion of the hub 71 to the hub 70. In the construction illustrated, the driving hub 71 would be secured to the shaft which drives the cam while the driven hub 70 would be attached to the pulley which receives its energy from the belt. Further description of this type of spring clutch is not considered necessary inasmuch as this clutch is conventional equipment and can be purchased on the market. An example of such a clutch is one produced by Curtiss-Wright Corporation under the trademark Precisionspring.

Figure 12:
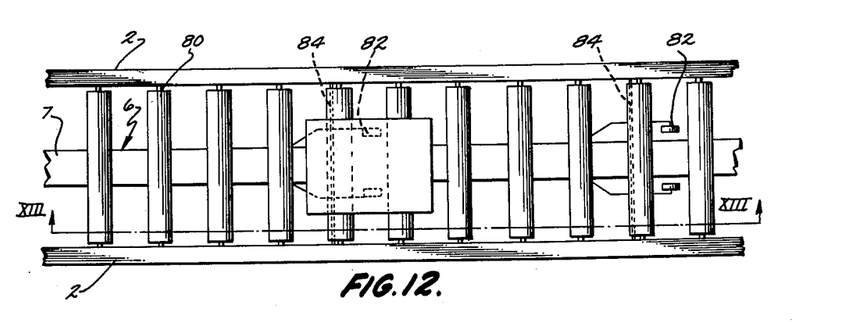
FIG. 12 is a somewhat schematic plan view of this invention applied to a power roll conveyor.
Figure 13:
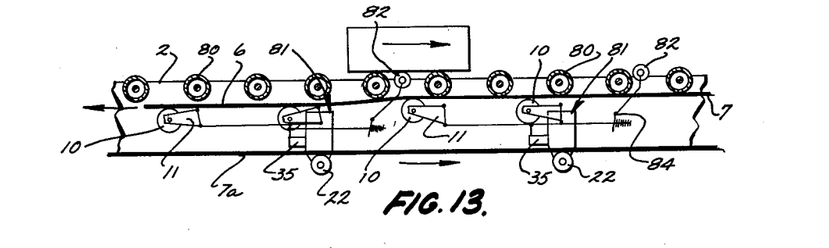
FIG. 13 is a schematic sectional elevation view taken along the plane XIII—XIII of FIG. 12.

FIGS. 12 and 13 illustrate the application of this invention to a solid roll conveyor. In this case the upper run 7 of the belt 6 instead of making direct contact with the articles contacts the lower surfaces of the rollers 80 forming the conveying surface. The upper run 7 of the belt is supported at spaced intervals by wheels 10 mounted on pivotally springable hangers 11. These in turn are raised and lowered by operating assemblies 81 which for all practical purposes are identical to the constructions illustrated in FIGS. 4, 5 and 6. Again, these are driven by the lower or return run 7a of the propelling member.

Since the articles will be propelled in the reverse direction as indicated by the arrow in FIG. 13, the sensing elements 82 are mounted on the opposite side of the operating assemblies 81. This necessitates relocation of the regulator plate 37 on the opposite side of the assembly 81 where it is linked to its associated sensing element 82. The sensing elements are each pivotally mounted on a suitable rod 84. Thus, as an article passes along the conveyor, it will depress one of the sensing elements 82 activating the clutch of the connected operating assembly 81, causing the upper run 7 of the propelling member to drop sufficiently to disengage the rollers 80 in the area affected. This creates a zone of no propelling force. Such a zone is illustrated at the left end of FIG. 13. As sugested in FIG. 13, two or more of the belt supporting hangers 11 may be linked together for simultaneous operation by a single operating assembly 81.

Figures 14, 15, 16, 17, 18:
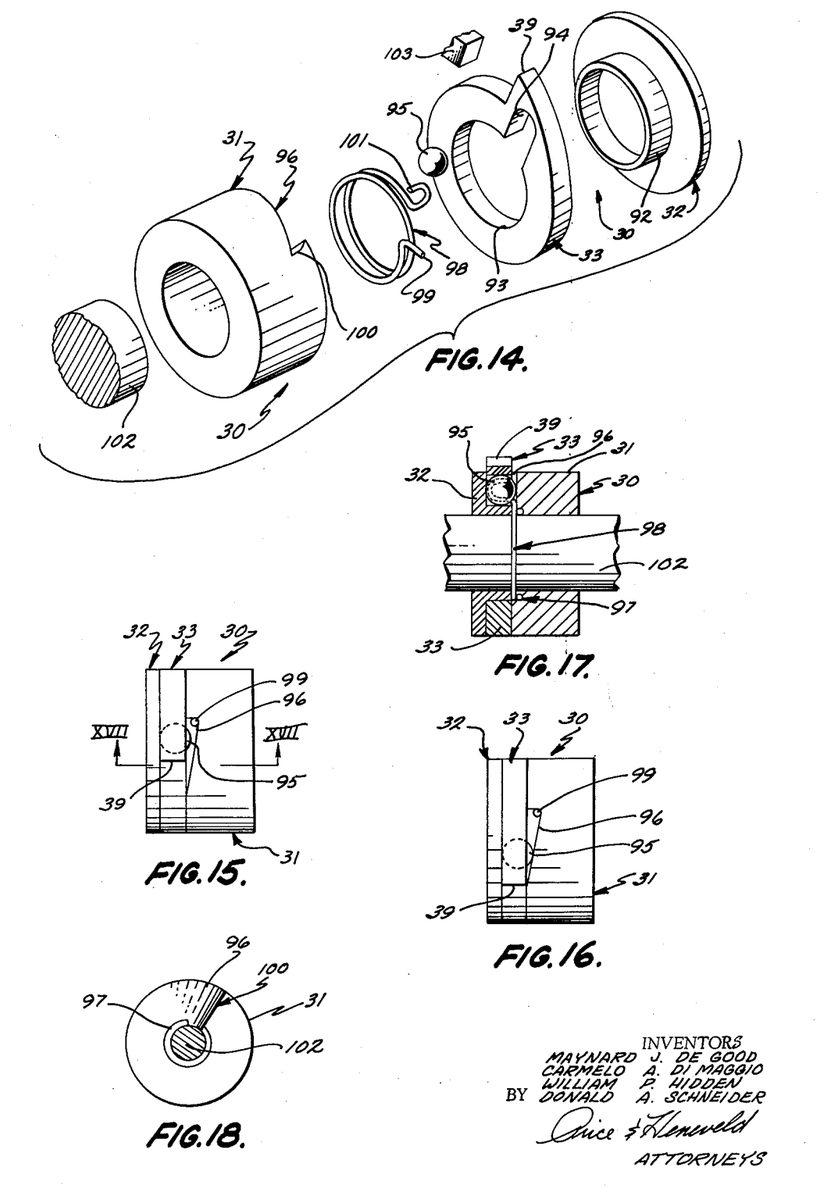
FIG. 14 is an enlarged perspective exploded view of a clutch mechanism utilized for this invention.
FIG. 15 is an enlarged view of the clutch illustrated in disengaged position.
FIG. 16 is an enlarged view of the clutch shifted to engaged position.
FIG. 17 is a sectional view taken along the plane XVII—XVII of FIG. 15.
FIG. 18 is a sectional view of the clutch taken along the plane of the face of the driven plate.

FIGS. 14 through 18 illustrate the specific construction of the clutch 30 utilized in the constructions of FIGS. 4, 5 and 6. Referring first to FIG. 14, the clutch 30 consists of a driving member or plate 32, control element or ring 33 and a driven member or plate 31. The driving plate 32 has an annular collar 92 extending from one side. The collar 92 is of substantially reduced diameter and seats within and acts as a bearing for the control ring 33. The control ring 33 is generally annular in shape with its central opening 93 of such diameter that there is no bind between it and the collar when the driving plate 32 is rotated while the control ring 33 is held stationary.

The control ring 33 has a radially projecting finger 39 designed to engage a stop whereby its rotation or non-rotation may be controlled. It will be recognized that, should additional instances of control be desired during each rotation, more than one finger 39 may be provided on the control ring.

Adjacent the finger 39, the control ring has a laterally extending aperture 94 which passes through the control ring from one side to another. Seated on this opening is the catenation member 95, which in its preferred form is a hardened steel ball. It fits loosely within the aperture 94. Its diameter is greater than the thickness of the control ring 33 and projects slightly beyond each side of the control ring.

Adjacent the face of the control ring facing oppositely from the driving plate 32 is the driven plate 31. The driven plate 31 has a tapered recess 96 in its face adjacent the control ring 33. The recess 96 tapers from its maximum depth to nothing in the direction of rotation indicated by the arrow for the driving plate 32.

This same face also has a central counterbore 97 (FIGS. 17 and 18) for reception of the spring 98. The spring has one radially projecting end 99 which seats against the end wall 100 of the recess 96. The other end of the spring has a laterally projecting loop which extends into the aperture 94 and seats behind the catenation member 95. The spring urges the catenation member in the direction of rotation of the driving plate 32. Between the ends 99 and 101, the spring is seated within the counterbore 97 and is wrapped about the shaft 102 which mounts the clutch assembly. Either one or neither the driving plate 32 or the driven plate 31 may be secured to the shaft 102. If the driving plate 32 is secured to the shaft, the shaft then becomes the source of power and the rest of the structure floats on the shaft. If the driven plate 31 is secured to the shaft, the shaft will only be rotated when the clutch is engaged. The driving plate 32 may be secured to any suitable source of rotary motion and the driven plate 31 may be secured to any suitable means for utilizing the rotary motion received through the clutch.

The control ring 33 is sandwiched between the driving and driven plates. Sufficient space is provided for it to prevent binding with either plate. Thus, it floats between them, subject however, to the frictional drag imposed upon it by the fact that it is supported by the collar 92 which is rotating constantly.

The principal of operation of the clutch is best illustrated in FIGS. 15 and 16. When the control ring 33 is held against rotation by a stationary means, such as is suggested at 103, engaging the stop 39, the catenation member 95 is held in the wider portion of the recess 96 where its diameter is such that it does not make locking contact with the inclined wall of the recess. Thus, the driving plate 32 will continue to rotate, but there being no positive physical connection between it and the driven plate 31, its motion will not be transmitted to the driven member. The slight frictional engagement between the control ring 33 and the driving plate 32 tends to urge the control ring to rotate with the driving member. Rotation, however, is prevented by the stationary stop 103 engaging the finger 39. The pressure exerted against the stop 103 is slight since it has to overcome only the slight forces generated by this frictional drag.

When the finger 39 is released, the slight frictional drag between the control ring 33 and the driving member 32 causes the control ring to move with the driving member. This moves the catenation member 95 into the narrow end of the recess 96. As it shifts toward the narrow end of the recess, the catenation member wedges between the face of the driving plate 32 and the tapered face of the recess 96. In this position, it locks together the driving and driven plates.

The clutch will operate in the manner described above in the absence of the spring 98. Where the spring 98 is utilized, the bias of the spring, upon release of the control ring 33, automatically rotates the control ring and the catenation member forward to form the lock between the driving and driven members. The use of the spring 98 does not change the principle of operation but it does reduce the lapse occasioned by the time necessary for frictional forces alone to shift the control ring to effect clutch engagement.

Once the wedge lock has been established, the transmission of force from the driving plate to the driven plate is effected solely by the catenation member. The control ring 33 merely floats, being carried along by the catenation member. Since the control ring 33 does not actually itself transmit the driving forces, it may be caused to engage or disengage with the application of very light pressures. It may be held in stationary position with only sufficient force as will overcome the slight tendency to rotate imposed by frictional drag as it rides on the driving member 32, or where the spring 98 is utilized, this force plus the force of the spring. The spring 98 is of low tension value and thus adds only slightly the forces generated by friction alone. To effect disengagement of the clutch, the only force necessary to be applied is that sufficient to overcome the momentum of the control ring and to shift the catenation member to the wide end of the recess 96. This again is a small force because the catenation member being locked on a ramp or inclined surface will shift with very little urging. At the same time, because the unit is operating on a wedge principle, a very positive connection is formed and substantial rotary forces may be transmitted by the clutch. Because of its simplicity of construction and operation, the clutch is dependable, inexpensive to construct and easy to service.

Figure 19:
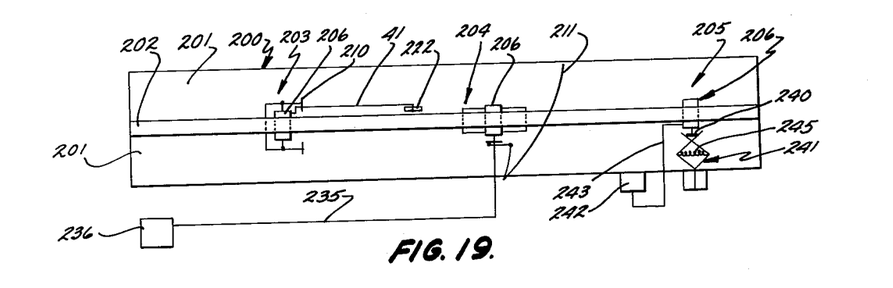
FIG. 19 is a schematic plan view of a conveyor system having auxiliary facility stations equipped with this invention.

FIGS. 19 through 23 schematically illustrate the broad application of this invention. In FIG. 19 a typical conveyor system 200 is equipped with article supporting tracks 201 and a central propelling member 202. The articles are moved along the conveyor by the continuously operated propelling member 202 driven from a single primary power source. Arranged along the conveyor are various types of auxiliary facility stations 203, 204 and 205. Each of these work stations is equipped with a power take-off unit 206 which has a wheel contacting the propelling member whereby it receives energy from and is driven by the propelling member. These power take-off units are constructed in the same manner as the power take-off units more specifically illustrated and described in FIGS. 3, 4, 5 and 6.

In this connection it is immaterial to this phase of the invention whether the conveyor is of the type just described or has a conveying surface consisting of rollers which are driven by contact from below with the propelling member. The conveying surfaces 201 may be formed of wheels, rollers, or any other friction reducing means even including slides or the so-called air cushioned conveyors.

The conveyor system may be of the linear type illustrated or may consist of one or more closed loops. Such conveyors may be powered throughout or consist of portions which are powered and active portions which are of the gravity type. In this description the term "auxiliary facility station" refers to equipment situated along the conveyor designed to perform some operation on or in connection with the articles being transported other than the act of transporting them. It will be recognized that while this invention has been described as tapping power from the return run of the propelling member, in many circumstances, it is entirely feasible to tap the power from the main or forward run to service the auxiliary facility stations.

Each of the auxiliary facility stations 203, 204 and 205 illustrate a different operation being carried out by power derived solely from the propelling member but each of these operations being something other than actually transporting the articles along the conveyor which is the primary function of the propelling member 202. At station 203 a gate 210 is provided (FIG. 20) for controlling the movement of articles along the conveyor. At station 204 a sweep-off 211 is provided (FIG. 21) for shifting articles off the conveyor onto some suitable receiver such as another conveyor, a platform or a work table. At station 205 an ejector unit 212 is shown (FIG. 22) which, when activated, pushes an article off the side of the conveyor. Such auxiliary facility stations and their functions are to be considered as illustrative only because innumerable operations or functions can be carried out at various such stations through power derived by means of this invention directly from the propelling member. Examples of such functions, but not exhaustive of them, would be the rotation of articles to properly orient them, labeling of articles for shipping, sealing of cartons, numbering or otherwise identifying articles, loading cartons, inverting articles in preparation for the next operation, erecting cartons received in folded condition, or removing articles from the conveyor either in response to signals carried by the article or by the carrier on which the article is being transported or by means of a manually generated signal by an operator situated at the work station or at some remote point.

Figure 20:
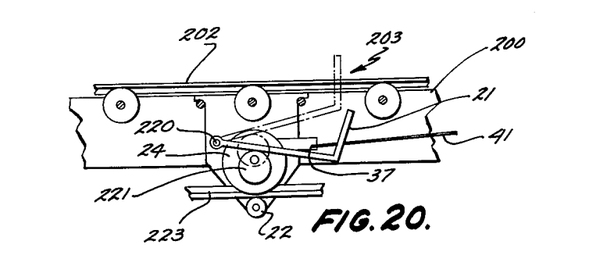
FIG. 20 is a fragmentary sectional elevation view of one of the auxiliary facility stations of FIG. 19.

Referring specifically to auxiliary facility station 203 and to FIG. 20, it will be seen that associated with the power take-off unit 206 is a case stop 210. The case stop 210 is pivoted in any suitable manner to the conveyor frame at 220. It rides upon an eccentric cam 221. When the cam is in the position illustrated in FIG. 20, the cast stop is lowered. However, when the cam is rotated to the opposite position, as suggested in broken lines in FIG. 20, the case stop is pivoted about the mounting 220 so that one end of it rises above the conveying surface to intercept the movement of articles along the conveyor. The cams 221 are operated through a clutch of the type previously described which itself is controlled through a regulator plate 37. This is operated through a connecting rod 41 by a sensor 222 projecting above the surface of the conveyor for actuation by articles passing along the conveyor. Bearing in mind the description given in connection with FIGS. 3 through 8, it will be understood that upon actuation of the sensor the clutch will cause the eccentric cam 221 to rotate 180° shifting the stop 210. The power take-off 206 is energized by contact with the return run 223 of the propelling member 202 through the wheel 22.

Figures 21, 22, 23:
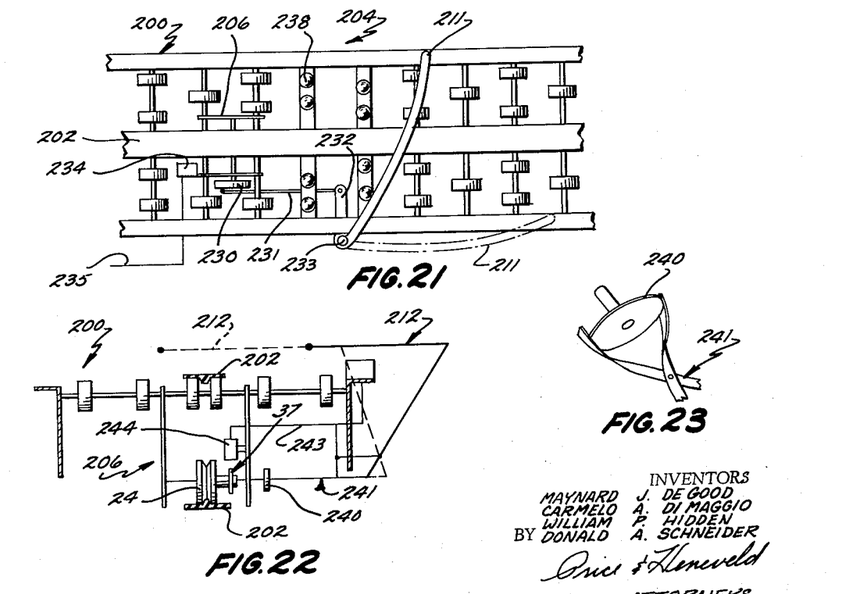
FIG. 21 is a fragmentary sectional elevation view of another of the auxiliary facility stations of FIG. 19.
FIG. 22 is a fragmentary sectional elevation view of still another of the auxiliary facility stations of FIG. 19.
FIG. 23 is a fragmentary perspective view of the motion translation mechanism used in FIG. 22.

Referring to FIG. 21, and to the auxiliary facility station 204, it will be seen that the same type of power take-off unit 206 is utilized as at the station 203. In this case, however, the power take-off unit operates an arm 230 which eccentrically mounts a link 231. The link 231 is connected to the lever 232. The lever 232 is secured to the shaft 233 journalled in the side of the conveyor. At its upper end the shaft 233 mounts the sweep-off arm 211. Upon 180° rotation of the arm 230 the sweep-off arm 211 is caused to pivot to inoperative or retracted position as indicated in phantom in FIG. 21. Ball transfers 238 may be substituted in portions of the conveyor surface to facilitate side movement of the articles. Again, it will be readily understood from the description given in connection with FIGS. 3 through 6, how operation of the clutch readily controls the position of the sweep-off arm 211.

In the case of the power take-off unit 206, the operation of the clutch is governed not by a mechanical linkage with a sensing element, but by a solenoid or similar device 234 which actuates the regulator plate 37 (not illustrated). The solenoid 234 is connected by a suitable circuit 235 to a central control panel 236 (FIG. 19). It will be recognized that the control panel 236 may be manually operated or may be of an automatic type which is preset to generate a signal upon the occurrence of one or more predetermined conditions.

Referring to auxiliary service facility station 205, the same power take-off unit 206 is utilized. As shown in FIGS. 22 and 23, it will be seen that the power take-off unit operates a double-ended cam member 240. The cam member engages a lazy-tong type linkage 241. The linkage 241 operates the article ejector 212. Thus, when the cam 240 is rotated 90° the lazy tong linkage 241 will be caused to move the ejector arm 212 across the conveyor, forcing an article in front of it off the conveyor onto a suitable receiving facility. In this case, the operation of the clutch within the power take-off unit 206 is controlled by a reading device 242 (FIG. 19) designed to read preset signals on the articles or on the carrier on which the articles are traveling as they move along the conveyor. The reader is connected by a suitable circuit 243 to a solenoid 244 which operates the regulator plate 37. Closure of the lazy-tong linkage can be assured by any suitable means such as the spring 245 (FIG. 19).

It will be understood in each of these descriptions that the illustrations of the structure are schematic and are intended to show principle rather than specific structures by which the auxiliary equipment will be executed. However, they do show, and are intended to show, the broad application of this invention in the conveying field. It will also be recognized that while various types of motion translating devices besides the lazy-tongs linkages and cams may be used as a means of translating the rotary motion obtained from the propelling member into linear motion. Many such devices are well-known in the art.

This invention has a number of advantages in the conveyor field. For the first time it provides a simple, compact, dependable, inexpensive means by which energy can be taken from the propelling member and accurately controlled for use with devices which require power only intermittently. Thus, for the first time, the energy available in the propelling member can be utilized anywhere along its length to drive auxiliary equipment through a control means which is so simple that its cost is but a tiny fraction of the cost of providing auxiliary power sources. This has the further advantage of making it practical to utilize a single central power source. At a fractional cost of a multiplicity of subordinate power sources, the central power source can be made adequate to supply the energy required by all of the items of auxiliary equipment. At the same time, the clutch provides a control means which may be operated by pressures of a few ounces at the most. Thus, the control means can be regulated by lightweight, relatively inexpensive devices. Furthermore, it can be made sensitive enough to assure positive actuation under all operating conditions.

When applied to an accumulator-type conveyor, it divorces the forces necessary to trigger the sensing elements from the forces necessary to raise and lower the propelling member. It does this without use of an auxiliary power source. The sensing elements can be set to trip on forces which are but a fraction of that necessary to support the belt. Thus, accumulator conveyors may be made to operate either with very light articles or with articles of wide range in weight and bulk. The propelling member can be supported in a manner which assures sufficient pressure to effect movement of the heaviest of the articles while the sensing units may be sensitive enough to respond to the lightest of the articles. All of this can be carried out in a unit which is compact, lightweight, and may be applied to existing equipment without significant reconstruction of the equipment.

While this invention has been described in a preferred embodiment together with several modifications thereof, it is to be understood that all additional modifications which embody the principle of this invention are to be considered covered by the hereinafter appended claims, unless these claims, by their language, expressly state otherwise.

We claim:

1. In a conveyor for articles having an endless driven article propelling member, said propelling member having a forward run and a return run; a wheel engaging and rotated by said return run; a support element for said forward run of said propelling member, said support element being movable to shift said propelling member from an article propelling position to an article non-propelling position; actuation means connected to said support element for moving said support element alternatively to each of said positions; a clutch connecting said wheel to said actuation means, said clutch being changeable between engaged and disengaged conditions and having a control element for changing the condition of said clutch; a sensing element adapted to be actuated by articles moving along said conveyor; means connecting said sensing element to said control element for actuating said control element to change the condition of said clutch in response to actuation of said sensing element by an article.

2. In a conveyor for articles having an endless driven article propelling member, said propelling member having a forward run and a return run; a wheel engaging and rotated by said propelling member; a support element for said forward run of said propelling member, said support element being movable to shift said propelling member from an article propelling position to an article non-propelling position; an actuation member; a clutch connecting said wheel to said actuation member, said clutch being changeable between engaged and disengaged conditions; said actuation member having a radially extending projection; a lever secured to said support element for moving said support element to each of said positions when said lever is oscillated; said lever being engaged by said projection and oscillated toward and away from said actuation member by said projection as said actuation member rotates; a sensing element adapted to be activated by articles moving along said conveyor; said sensing element being connected to said clutch for changing the position of said clutch when said sensing element is actuated.

3. In a conveyor for articles having an endless driven article propelling member, said propelling member having a forward run and a return run; means engaging and driven by said return run; a plurality of support elements for said forward run of said propelling member, said support elements each being movable from an article propelling position to an article non-propelling position; actuation means having a clutch operatively connecting said actuation means to said support elements for moving said support elements alternately to each of said positions; said clutch being changeable from an engaged to a disengaged condition; said clutch having a control element for changing the condition of said clutch; a sensing element adapted to be actuated by articles moving along said conveyor, a means connecting said sensing element to said control element for actuating said control element and changing the condition of said clutch in response to actuation of said sensing element by an article.

4. In a conveyor for transporting articles, said conveyor having a power driven propelling member for moving articles along said conveyor; supporting elements for said propelling member, said supporting elements being movable for shifting said propelling member into article propelling and article non-propelling positions; means for moving said supporting elements from one of said positions to the other; said means having a rotatable member engaging said propelling member and driven thereby and an actuator for moving said supporting elements; a clutch connecting said rotatable member and said actuator, said clutch having a movable control element governing its engagement and disengagement; a regulator engaging said control element; a sensing element adapted to be actuated by articles moving along said conveyor; means connecting said sensing element to said regulator and normally hold said regulator in position to effect clutch disengagement; upon actuation of said sensing element by an article said regulator effecting engagement of said clutch; and a release member on said regulator for effecting disengagement of said clutch after said actuator has shifted said support elements from one position to the other while said sensing element remains actuated; said regulator being moved by said sensing element to re-engage said clutch to return said actuator to its original position upon release of said sensing element by an article.

5. A conveyor as described in claim 17 wherein said clutch has a driven plate and a driving plate with said control element therebetween; said driving plate being connected to said rotatable member and said driven plate being connected to said actuator; said control element having a catenation member; said catenation member, when said control element is released for rotation with said driving plate, wedging against both said driving and driven plates and transmitting motion from one to the other and when said control element is held against rotation disengaging one of said driving and driven plates; said control element having a radially projecting finger adapted to hold said control element against rotation upon engagement thereof by said regulator.

6. A conveyor as described in claim 4 wherein said clutch has a driven plate and a driving plate with said control element therebetween; said plates having radially extending faces one adjacent each side of said control element; said driving plate being connected to said rotatable member and said driven plate being connected to said actuator; said radial face of said driven member having a pocket of increasing depth in a direction opposite to the rotation of said driving member; said control element having a catenation member; said catenation member having a width greater than the normal spacing between said radial faces and less than the deeper portion of said pocket; said catenation member when said control element is released for rotation with said driving plate, shifting to the shallow portion of said pocket and wedging against both said driving and driven plates and transmitting motion from one to the other and when said control element is held against rotation shifting to the deeper portion of said pocket and disengaging one of said driving and driven plates.

7. A conveyor as described in claim 6 wherein said control element has a radially projecting finger adapted to hold said control element against rotation upon engagement thereof by said regulator.

8. In a conveyor for transporting articles, said conveyor having an article supporting surface and a powered propelling member; said propelling member having a forward run and a return run; a plurality of supporting brackets mounted on said conveyor for pivotal movement between a raised position and a lowered position, said supporting brackets supporting said forward run of said propelling member and in raised position holding said propelling member in article propelling position; an actuator mounted on said conveyor; said actuator having a wheel, a clutch and cam; said wheel engaging and being driven by said return run of said propelling member; said clutch connecting said wheel to said cam for rotation therewith; a lever connected to said support brackets for pivoting said support brackets to each of said positions; a radially extending projection on said cam engaging said lever and swinging said lever outwardly therefrom as it rotates past said lever; said clutch having an engaged and a disengaged condition and, a control element governing its condition; a shift member engageable with and regulating the operation of said control element; a sensing element and means connecting said sensing element to said shift member; said sensing element, when activated by an article on said conveyor, moving said shift member to release said control element, release of said control element changing said clutch to engaged condition; said shift member having a stop engaging said control element after said cam has pivoted said lever to the opposite position while said sensing element remains activated, said control element upon engaging said stop changing said clutch to disengaged condition; said cam while said clutch remains so disengaged holding said supporting brackets in lowered position; said sensing element upon deactivation by an article moving said shift member to release said control element for engaging said clutch and rotating said cam; rotation of said cam permitting said lever to return its original position.

9. A conveyor as described in claim 8 wherein said control element has a radially projecting finger and is rotatably mounted; said shift member having a pair of spaced ears moved therewith to make alternate engagement with said finger as said sensing element is activated and deactivated.

10. In a conveyor having an endless powered propelling member, means for driving auxiliary equipment from said propelling member, said means comprising: a frame; a wheel rotatably mounted in said frame, said wheel engaging and driven by said propelling member; an element rotatably mounted in said frame; a clutch for connecting said wheel and said element; said clutch having a driving plate and a driven plate secured to said wheel and said element respectively, each of said plates having a radially extending face; a control ring seated between said faces of said plates for rotation concentrically therewith; said driven plate having a recess in said face thereof proximate to said control ring, said recess being tapered with its depth decreasing in the direction of rotation of said driving plate; said control ring having an aperture therein opening through said ring toward both of said plates; a catenation member seated in said aperture and being of a dimension greater than the spacing between said driving plate and the shallow portion of said recess and less than the spacing between said driving plate and the deep end of said recess; said control ring having stop engaging means whereby said control ring may be held stationary; said control ring, when free to rotate, holding said catenation member in the shallow end of said recess for locking said driving plate to said driven plate and when stationary holding said catenation member in the deep end of said recess and disengaged from said driven plate.

11. A clutch for intermittently connecting a source of rotary motion to a utilizer of rotary motion, said clutch comprising: a driving plate and a driven plate and a control ring therebetween and means mounting said plates and control ring for concentric rotation, each of said plates having a radially extending face adjacent said control ring; said driven plate having a recess in said face thereof proximate to said control ring, said recess being tapered with its depth decreasing in the direction of rotation of said driving plate; said control ring having an aperture therein opening through said ring toward both of said plates; a catenation member seated in said aperture and being of a dimension greater than the spacing between said driving plate and the shallow portion of said recess and less than the spacing between said driving plate and the deep end of said recess; said control ring having means thereon for holding stationary; said control ring, when free to rotate, holding said catenation member in the shallow end of said recess for locking said driving plate to said driven plate and when stationary holding said catenation member in the deep end of said recess and disengaged from said driven plate.

12. A clutch as described in claim 11 wherein said catenation member is a ball.

13. A clutch as described in claim 11 wherein a spring is provided urging said catenation member toward said shallow end of said recess.

14. A clutch as described in claim 11 wherein a spring is provided urging both said control ring and said catenation member toward said shallow end of said recess.

15. A conveyor having an article supporting track and an endless driven propelling member for propelling articles along said track and at least one auxiliary facility station associated with and situated along said conveyor having a power operated work member; a rotatable power take-off element engaging and continuously driven by said propelling member at said auxiliary facility station; means connecting said power take-off element to said work member, said connecting means having a power interruption means; said power interruption means having a control member regulating its power transmission and interruption to said work member, a regulator shiftable between two positions, in one position said regulator engaging said control member and holding it in a position effecting power interruption by said power interruption means and in the other position releasing said control member to effect power transmission by said power interruption means; control means connected to said regulator for shifting said regulator between said two positions.

16. A conveyor as described in claim 15 wherein said power take-off means is a wheel rotated by said propelling member.

17. A conveyor as described in claim 15 wherein said propelling member has an article propelling run and a return run and said power take-off means engages said return run; said power take-off means being a wheel.

18. A conveyor for articles having an article supporting track and an endless driven propelling member; movable means supporting said propelling member in one of two positions, in one of said positions said propelling member effecting article movement and in the other thereof said propelling member effecting no movement of the articles; a rotary power take-off element engaging and continuously driven by said propelling member; an operating unit connected to said movable means for shifting said movable means and the propelling member supported thereon between said two positions; drive means having a clutch connecting said power take-off means to said operating unit, said clutch being changeable between engaged and disengaged conditions, said clutch when engaged transmitting power through said drive means to said operating unit and when disengaged disconnecting said power take-off element from said operating unit; said clutch having a control member engaging and disengaging said clutch; sensing means responsive to the presence of an article proximate thereto on said conveyor and connected to said control member for actuating said control member to change the condition of said clutch and thus the position of said propelling member.

19. A conveyor having an article supporting track and an endless driven propelling member for propelling articles along said track and at least one auxiliary facility station associated with and situated along said conveyor having a power operated work member; a rotatable power take-off element engaging and continuously driven by said propelling member at said auxiliary facility station; means connecting said power take-off element to said work member, said connecting means having a clutch regulating the operation of said work member, said clutch when engaged transmitting power through said connecting means from said power take-off element to said work member and when disengaged disconnecting said work member from said power take-off element; a control member for said clutch, said control member engaging and disengaging said clutch; means for regulating the operation of said control member.

20. A conveyor having a frame and supporting members defining a track and an endless driven propelling member for propelling articles along said track and at least one auxiliary facility station associated with and situated along said conveyor having a power operated work member; a rotatable power take-off element engaging and continuously driven by said propelling member at said auxiliary facility station; means connecting said power take-off element to said work member, said connecting means having a driving element and a driven element and disengageable power transmission means connecting said driving and driven elements; control means for said power transmission means, said control means effecting engagement and disengagement of said power transmission means for regulating the delivery of power to said work member.

References Cited in the file of this patent

UNITED STATES PATENTS

| | | |
|---|---|---|
| 1,089,512 | Traub | Mar. 10, 1914 |
| 1,465,486 | Sandiford | Aug. 21, 1923 |
| 2,148,170 | Mixer | Feb. 20, 1939 |
| 2,769,515 | Thomas | Nov. 6, 1956 |
| 2,792,792 | Seewer | May 21, 1957 |
| 2,895,593 | McKnight | July 21, 1959 |
| 3,000,489 | Poel | Sept. 19, 1961 |

UNITED STATES PATENT OFFICE
CERTIFICATE OF CORRECTION

Patent No. 3,136,406                          June 9, 1964

Maynard J. De Good et al.

It is hereby certified that error appears in the above numbered patent requiring correction and that the said Letters Patent should read as corrected below.

Column 3, line 40, for "eqipument" read -- equipment --; column 6, line 42, after "unit" insert a period; column 12, line 62, for the claim reference numeral "17" read -- 4 --; column 14, line 38, after "holding" insert -- it --.

Signed and sealed this 9th day of February 1965.

(SEAL)
Attest:

ERNEST W. SWIDER
Attesting Officer

EDWARD J. BRENNER
Commissioner of Patents